United States Patent
Stanton et al.

(10) Patent No.: US 9,767,676 B2
(45) Date of Patent: Sep. 19, 2017

(54) SECURITY SYSTEM STORAGE OF PERSISTENT DATA

(75) Inventors: Dougal Stanton, Edinburgh (GB); Robert John Probin, Glasgow (GB); Martin Crisp, Motherwell (GB); Kenneth Osborne, Glasgow (GB); Alan Robert McWhirter, West Lothian (GB)

(73) Assignee: Honeywell International Inc., Morristown, NJ (US)

( * ) Notice: Subject to any disclaimer, the term of this patent is extended or adjusted under 35 U.S.C. 154(b) by 676 days.

(21) Appl. No.: 13/348,187

(22) Filed: Jan. 11, 2012

(65) Prior Publication Data

US 2013/0179625 A1   Jul. 11, 2013

(51) Int. Cl.
*G08B 25/14* (2006.01)
*G08B 29/16* (2006.01)
*G06F 3/06* (2006.01)

(52) U.S. Cl.
CPC .......... *G08B 25/14* (2013.01); *G08B 29/16* (2013.01); *G06F 3/065* (2013.01); *G06F 3/0679* (2013.01)

(58) Field of Classification Search
CPC ...... G08B 29/16; G08B 29/123; G08B 29/00; G08B 29/12; G08B 29/14; G08B 29/126; G08B 29/145; G06F 1/3203; G06F 1/3268; G06F 3/06; G06F 3/0608; G06F 3/064; G06F 3/0643; G06F 3/0652;
(Continued)

(56) References Cited

U.S. PATENT DOCUMENTS 4,361,832 A * 11/1982 Cole ........................... 340/505
4,703,325 A * 10/1987 Chamberlin et al. ......... 340/520
(Continued)

FOREIGN PATENT DOCUMENTS

WO   WO2008041214   *  4/2008   ............ G08B 29/16

OTHER PUBLICATIONS

Definition nonvolatile memory, Margaret Rouse, Sep. 2005, retrieved from http://searchstorage.techtarget.com/definition/nonvolitile-memory on May 7, 2014 (1 page).*
(Continued)

*Primary Examiner* — Daniel C Chappell
(74) *Attorney, Agent, or Firm* — Wood, Phillips, Katz, Clark & Mortimer

(57) ABSTRACT

A security system including devices generating persistent data, a local control system (LCS) including a microprocessor and non-volatile memory and receiving persistent data from the devices, and a server remote from the LCS. The remote server is in communication with the LCS microprocessor which periodically transmits logical portions of persistent data (each including a timestamp) to the remote server where it is saved. The microprocessor also periodically saves the persistent data portions in LCS non-volatile memory less frequently than the persistent data portions are periodically saved in the remote data storage, and saves the timestamp in the local data storage for each persistent data portion saved only at the remote server. When rebooting the LCS, the microprocessor retrieves from the remote data storage only the persistent data portions having timestamps subsequent to the timestamp saved in the local data control system non-volatile memory.

12 Claims, 1 Drawing Sheet

(58) Field of Classification Search
CPC ...... G06F 3/0655; G06F 3/067; G06F 3/0673;
G06F 3/0674; G06F 3/0679; G06F
3/0685; G06F 3/0688; G06F 11/1008;
G06F 11/1092; G06F 11/1402; G06F
11/1446; G06F 11/1448; G06F 11/1456;
G06F 11/1458; G06F 11/1469; G06F
11/1471; G06F 11/1474; G06F 11/3476;
G06F 11/2064; G06F 11/3006; G06F
12/00; G06F 12/0238; G06F 12/0246;
G06F 12/0804; G06F 12/0871; G06F
12/0891; G06F 12/16; G06F 13/1694;
G06F 17/30368; G06F 17/30371; G06F
17/30551; G06F 17/30575; G06F
17/30578; G06F 2201/80; G06F 2201/84;
G06F 2212/2022; G06F 2212/207; G06F
2212/222; G06F 2212/7205; G06F
2213/0038; G11B 27/034; G11B 27/105;
H05K 7/1487; Y10S 707/99931; Y10S
707/99932; Y10S 707/99933; Y10S
707/99934; Y10S 707/99937; Y10S
707/99939; Y10S 707/99942; Y10S
707/99943; Y10S 707/99945; Y10S
707/99952; Y10S 707/99953; Y10S
707/99955

See application file for complete search history.

(56) References Cited

U.S. PATENT DOCUMENTS

| | | | | |
|---|---|---|---|---|
| 4,868,859 | A * | 9/1989 | Sheffer | 379/39 |
| 5,086,502 | A * | 2/1992 | Malcolm | 714/6.13 |
| 5,189,395 | A * | 2/1993 | Mitchell | 340/539.11 |
| 5,384,697 | A * | 1/1995 | Pascucci | 700/10 |
| 5,412,801 | A * | 5/1995 | de Remer et al. | 714/20 |
| 5,440,727 | A * | 8/1995 | Bhide et al. | 711/117 |
| 5,511,188 | A * | 4/1996 | Pascucci et al. | |
| 5,625,819 | A * | 4/1997 | Hoffer, Jr. | |
| 5,668,991 | A * | 9/1997 | Dunn et al. | |
| 5,784,552 | A * | 7/1998 | Bishop et al. | 714/38.12 |
| 5,890,155 | A * | 3/1999 | Steinman et al. | |
| 6,055,632 | A * | 4/2000 | Deegan et al. | 713/100 |
| 6,373,389 | B1* | 4/2002 | Przygoda et al. | 340/572.4 |
| 6,732,125 | B1* | 5/2004 | Autrey et al. | 707/640 |
| 6,948,070 | B1* | 9/2005 | Ginter et al. | 713/193 |
| 7,172,113 | B2* | 2/2007 | Olenick et al. | 235/380 |
| 7,253,728 | B2* | 8/2007 | Johan et al. | 340/531 |
| 7,376,712 | B1* | 5/2008 | Granatelli et al. | 709/219 |
| 8,086,688 | B1* | 12/2011 | Bacastow | 709/213 |
| 8,224,248 | B2* | 7/2012 | Demirbasa et al. | 455/41.2 |
| 8,504,103 | B2* | 8/2013 | Ficquette | 455/556.1 |
| 8,508,355 | B2* | 8/2013 | Pineau et al. | 340/506 |
| 2003/0061621 | A1* | 3/2003 | Petty et al. | 725/105 |
| 2003/0141971 | A1* | 7/2003 | Heiken, Jr. | 340/506 |
| 2003/0182435 | A1* | 9/2003 | Redlich et al. | 709/229 |
| 2004/0137847 | A1* | 7/2004 | Mizunuma et al. | 455/66.1 |
| 2004/0214642 | A1* | 10/2004 | Beck | 463/40 |
| 2005/0085180 | A1* | 4/2005 | Ballay et al. | 455/1 |
| 2005/0085248 | A1* | 4/2005 | Ballay et al. | 455/500 |
| 2005/0086366 | A1* | 4/2005 | Luebke et al. | 709/238 |
| 2005/0128295 | A1* | 6/2005 | Addy | 348/153 |
| 2005/0138109 | A1* | 6/2005 | Redlich et al. | 709/201 |
| 2005/0138110 | A1* | 6/2005 | Redlich et al. | 709/201 |
| 2006/0015545 | A1* | 1/2006 | Ezra | G06F 11/1456 |
| 2006/0092010 | A1* | 5/2006 | Simon et al. | 340/521 |
| 2006/0092011 | A1* | 5/2006 | Simon | G08B 13/19682 340/521 |
| 2006/0247021 | A1* | 11/2006 | Bulthuis | A63F 13/10 463/24 |
| 2006/0259184 | A1* | 11/2006 | Hayes et al. | 700/221 |
| 2006/0261974 | A1* | 11/2006 | Albert et al. | 340/870.07 |
| 2007/0013513 | A1* | 1/2007 | Tang et al. | 340/541 |
| 2007/0026371 | A1* | 2/2007 | Wood | 434/317 |
| 2007/0030142 | A1* | 2/2007 | Gresset et al. | 340/506 |
| 2007/0237403 | A1* | 10/2007 | Keith | 382/232 |
| 2008/0122691 | A1* | 5/2008 | Carani et al. | 342/357.07 |
| 2008/0125964 | A1* | 5/2008 | Carani et al. | 701/207 |
| 2008/0168135 | A1* | 7/2008 | Redlich et al. | 709/204 |
| 2009/0178144 | A1* | 7/2009 | Redlich et al. | 726/27 |
| 2009/0254572 | A1* | 10/2009 | Redlich et al. | 707/10 |
| 2009/0261967 | A1* | 10/2009 | Chen | 340/531 |
| 2009/0315671 | A1* | 12/2009 | Gocho | 340/5.8 |
| 2009/0322527 | A1* | 12/2009 | Crisp et al. | 340/541 |
| 2010/0250497 | A1* | 9/2010 | Redlich et al. | 707/661 |
| 2010/0280635 | A1* | 11/2010 | Cohn et al. | 700/90 |
| 2010/0318686 | A1* | 12/2010 | Ver Steeg | H04L 12/66 710/8 |
| 2011/0196840 | A1* | 8/2011 | Barzilai et al. | 707/645 |
| 2011/0252071 | A1* | 10/2011 | Cidon | 707/802 |
| 2012/0239860 | A1* | 9/2012 | Atkisson et al. | 711/103 |
| 2013/0120134 | A1* | 5/2013 | Hicks, III | 340/501 |
| 2013/0166855 | A1* | 6/2013 | Batwara et al. | 711/154 |
| 2014/0104062 | A1* | 4/2014 | Weiner | 340/573.1 |

OTHER PUBLICATIONS

Memory definition, Apr. 5, 2001, retrieved from https://web.archive.org/web/20010405233700/http://www.webopedia.com/TERM/M/memory.html on May 7, 2014 (2 pages).*
definition of previous, Merriam-Webster Online Dictionary, retrieved from http://www.merriam-webster.com/dictionary/previous on Nov. 26, 2014 (1 page).*
A Home Terminal System Using the Home Area Information Network, Yamamoto et al, IEEE Transactions on Consumer Electornics, Nov. 1984, pp. 608-616 (9 pages).*
definition of revert, Vocabulary.com, retrieved from http://www.vocabulary.com/dictionary/revert on Nov. 26, 2014 (1 page).*
Definition nonvolatile memory, Margaret Rouse, Sep. 2005, retrieved from http://searchstorage.techtarget.com/definition/non-volatile-memory on May 7, 2014 (1 page).*
Memory definition, Apr. 5, 2001, retrieved from https://web.archive.org/web/20010405233700/http://www.webopedia.com/TERM/M/memory.html on May 7, 2014.*
Google uncloaks once-secret server, Stephen Shankland, Apr. 1, 2009, retrieved from http://www.cnet.com/news/google-uncloaks-once-secret-server-10209580/ on Nov. 26, 2014 (9 pages).*
Home Security Robot based on Sensor Network, Kim et al, SICE-ICASE International Joint Conference, Oct. 18-21, 2006 (6 pages).*
Google D&S, Bill Webb, Oct. 16, 2006, retrieved from http://www.lockergnome.com/windows/2006/10/16/google-damps/ on Nov. 25, 2014.*
Wireless sensor networks for habitat monitoring, Mainwaring et al, WSNA '02 Proceedings of the 1st ACM international workshop on Wireless sensor networks and applications, Sep. 28, 2002, pp. 88-97 (10 pages).*
Discrete Structures; Gupta et al; May 1, 2010; retrieved from https://books.google.com/books?id=DYKikmfkcE0C&pg=PA3&lpg=PA3&dq=every+set+is+a+subset+of+itself+proof&source=bl&ots=DwHD7RntcC&sig=X1LdTk2aZGJjTdNquaAsI6it89s&hl=en&sa=X&ved=0CH0Q6AEwEmoVChMInvaT7sjxyAIVgjwmCh0Z4QKA#v=onepage&q&f=false on Nov. 2, 2015; p. 3 (1 page).*
Storage efficient replicated databases; Agrawal et al; IEEE Transactions on Knowledge and Data Engineering, col. 2, iss. 3; Sep. 1990; pp. 342-352 (11 pages).*
Towards event ordering in digital forensics; Levett et al; Proceedings of the 12th ACM workshop on Multimedia and security; Sep. 9-10, 2010; pp. 35-42 (8 pages).*
CEC: Continuous eventual checkpointing for data stream processing operators; Sebepou et al; 2011 IEEE/IFIP 41st International Conference on Dependable Systems & Networks; Jun. 27-30, 2011; pp. 145-156 (12 pages).*
Cloud Storage Design Based on Hybrid of Replication and Data Partitioning; Ye et al; 2010 IEEE 16th International Conference on

(56) References Cited

OTHER PUBLICATIONS

Parallel and Distributed Systems; Dec. 8-10, 2010; pp. 415-422 (8 pages).*

* cited by examiner

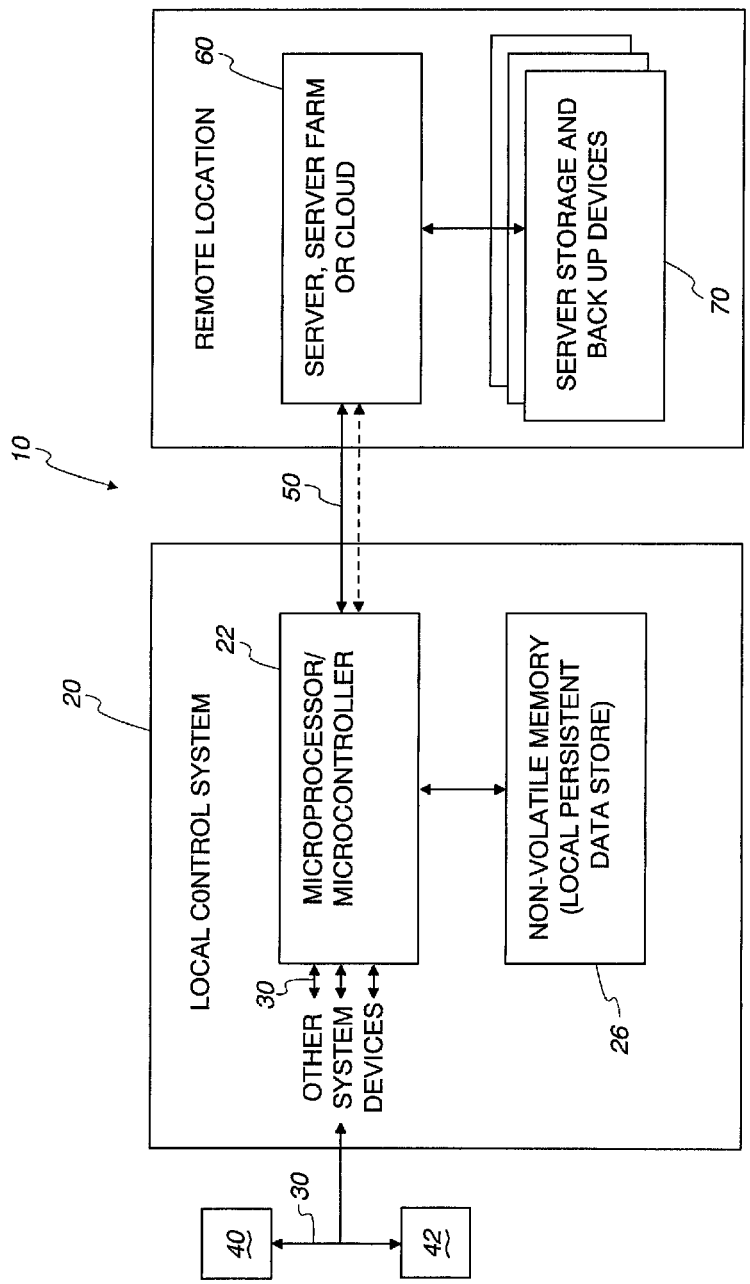

SECURITY SYSTEM STORAGE OF PERSISTENT DATA

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

The present invention relates to a security system, and more particularly to a security system and method for remotely monitoring one or more specified areas.

BACKGROUND

Typical currently known security systems generally include an on site control device such as a control panel. The control panel may include a microprocessor with software or firmware designed for monitoring one or more sensors designated to specified areas. The sensors may be divided into security zones which are all monitored by the central control panel. The control panel is a significant cost of the security system. The security system, including the control panel, requires installation, inspections, maintenance, repairs, and upgrades. The control panel hardware can be expensive and the installation requires the time of a skilled technician. Further, when updating the software or firmware, a technician has to visit the site where the security system and control panel are located, which is costly and time consuming. Additionally, it is possible that upgrading the security system requires additional hardware or changing hardware to enable new features or functions, which can be costly and require the time of a skilled technician. Further, a supplier and/or warehouse may have to stock large quantities of various panel types to meet demand, thus incurring cost.

In many such security systems, persistent storage has been required, with such requirements met by battery-backed RAM systems or EEPROM memory devices. However, as the memory/storage requirements for such systems have grown, such systems have increasingly used flash IC storage systems. While flash IC storage systems provide more storage capacity per cost unit, they are more limited that the RAM systems and EEPROM memory devices. Thus, while RAM systems will almost instantaneously save data an unlimited number of times and EEPROM memory devices (though slower than RAM systems) are capable of writing millions of individual bytes or words per memory cell, the advantageously relatively inexpensive flash storage systems are slower still (taking longer to erase and write). Further, the flash storage systems have a limited writable lifespan and require that data be erased and written in large blocks or pages. As a result, in order to use such flash storage systems in security systems, complex management has been necessary to handle and write data efficiently in order to be able to minimize the read/write cycles which occur during normal operation of the security system, United States Patent Publication No. US 2009/0322527 A1 (entitled "Server Based Distributed Security System", published Dec. 31, 2009) discloses one system which may be used for handling the memory requirements of security systems.

The present invention is directed to providing the memory and data storage requirements of a security system whereby the life of the hardware may be maximized.

SUMMARY

In one aspect of the present invention, a method is provided for storing persistent data for a security system having a local control panel in communication with a remote server, where the local control panel has local data storage and the remote server has storage remote from the local data storage. The method includes the steps of (1) periodically saving logical portions of existing persistent data at the remote server, (2) periodically saving the logical portions of existing persistent data at the local data storage, where the logical portions of current persistent data each include a distinguishing data element, (3) saving the distinguishing data element in the local data storage of each logical portion of existing persistent data saved only at the remote server; and (4) reconstructing the persistent data on the local control panel after rebooting the local control panel. The periodic saving at the local data storage is performed less frequently than the periodic saving at the remote server. During the reconstructing step, only the logical portions of existing persistent data having distinguishing data elements subsequent to the distinguishing data element saved at the local data storage are written from the remote storage and saved at the local data storage.

In one form of this aspect of the present invention, the distinguishing data elements are time stamps.

In another form of this aspect of the present invention, the local data storage is non-volatile memory. In a further form, the local data storage is flash memory.

In still another form of this aspect of the present invention, the remote data storage is at least one of RAM and EEPROM memory devices. In a further form, the local data storage is flash memory.

In another aspect of the present invention, a security system is provided, including security devices generating persistent data, a local control system receiving the persistent data from the security devices, the local control system including a microprocessor and a non-volatile memory, and a server remote from the local control system. The remote server has remote data storage and is in communication with the local control system microprocessor. The microprocessor periodically transmits logical portions of current persistent data to the remote server for saving in the remote data storage, where the logical portions of current persistent data each include a distinguishing data element. The microprocessor also periodically saves the logical portions of current persistent data in the local control system non-volatile memory less frequently than the persistent data is periodically saved in the remote data storage, and saves the distinguishing data element in the local data storage for each logical portion of existing persistent data saved only at the remote server. When rebooting the local control system, the microprocessor retrieves from the remote data storage only the logical portions of existing persistent data having distinguishing data elements subsequent to the distinguishing data element saved in the local data control system non-volatile memory.

In one form of this aspect of the present invention, the distinguishing data elements are time stamps.

In another form of this aspect of the present invention, the non-volatile memory comprises flash IC storage.

In still another form of this aspect of the present invention, the remote data storage is at least one of RAM and EEPROM memory devices. In a further form, the non-volatile memory is flash IC storage.

Other features and advantages will become apparent from a review of the entire specification, including the appended claims and drawings.

BRIEF DESCRIPTION OF THE DRAWINGS

The FIGURE is a schematic view of a security system according to the present invention.

DETAILED DESCRIPTION

A security system 10 according to the present invention is shown in the FIGURE. The security system 10 includes a local control system 20 (e.g., a control panel) including a microprocessor/microcontroller 22 and a non-volatile memory 26.

As should be appreciated when a full understanding of the present invention is had, the non-volatile memory 26 can advantageously be, for example, relatively inexpensive flash storage devices, even though such devices are generally slower, have a more limited writable lifespan, and require more complex management, than other (more expensive) memory devices. The cost savings of using, and preserving, inexpensive non-volatile memory 26 is becoming increasingly valuable as the memory requirements of security systems 10 continue to grow.

The microprocessor 22 is in communication via data links 30 (which can be any suitable communication link, whether wired or wireless) to other security system devices 40, 42 such as alarms, status monitors, motion detectors, etc.

The microprocessor is also in communication via data links 50 (which also can be any suitable communication link for transmitting data) to a remote server 60 which is linked to remote data storage 70.

The data links 50 may advantageously be 'always-on' data connection to a remote server, allowing the remote server 60 to advantageously run software to store alarm panel configuration, and send this configuration to, for example, an alarm panel. However, it should be appreciated that the connection via data links 50 could alternatively be an 'on-demand' data connection (e.g. PSTN 'dial-up'), and/or data could be cached and periodically sent via a periodic or less than 'on-demand' connection. If "on-demand" data links 50 are used, the links 50 preferably should have a low connection time in order to not potentially burden the local control system 20 with a local data buffer/cache.

Further, it should be appreciated that a 'keep-alive' or 'heat-beat' signal between the local control system 20 and the remote server 60 might be advantageously provided in operation, whereby a fault would be signalled to an alarm receiving (monitoring) center if data communication over the links 50 is not available.

It should also be appreciated that the data links 50 may be "dual path signalling" or multi-path signalling in order to increase the robustness of the data connection to the remote server 60. Further, connection types could be mixed within the scope of the present invention with, for example, a primary communication path "always-on" with secondary and tertiary connections being "on-demand" connections. Of course, suitable encryption and authentication methods may also be advantageously used with data communications over the data links 50 for security reasons.

The remote data storage 70 may be PC hard drive(s), or advantageously, for example, battery-backed RAM systems (which allow almost instantaneous save with unlimited writes) or EEPROM memory devices (which allow millions of writes per memory cell, and such writes can be per individual byte or word). Further, it should be appreciated that in accordance with the present invention the remote data storage 70 could also be advantageously implemented by, for example, a server PC (either at a physically remote location or on the local site—for large sites that have several systems) but not next to the actual control system, a collection of server PCs that share workload (e.g., a server farm), processing storage implemented by Cloud computing, or a dedicated machine that provides the storage services.

Advantageous operation of the security system 10 of the present invention is as follows.

The security system devices 40, 42 provide data including events (and logs of the events), run-time data (such as set/armed status) and system configuration data updates (all hereinafter referred to as "persistent data") to the local control system 20.

The microprocessor 22 sends existing received persistent data (either in its entirety or in logical portions or divisions of the data) directly to the remote server 60 via data link 50, where the persistent data is written and saved in the remote data storage 70.

The microprocessor 22 also causes the persistent data to be periodically written and stored locally on the non-volatile memory 26. However, in accordance with the present invention, such persistent data is saved in the local non-volatile memory 26 less frequently than it is saved in the remote data storage 70. Whenever the less frequent storage of persistent data is done at the local non-volatile memory 26, the microprocessor 22 saves a data element which distinguishes that saved persistent data from other persistent data (e.g., a timestamp, or sequential index numbers, including separate index numbers for different subsystems) and sends that distinguishing data element to the remote data storage 70 as well.

It should be appreciated, however, that variations from the above described storage at the local control system 20 may be desirable. For example, when events are detected which indicate a possible problem or cessation of normal operation (e.g., communication via the data links 50 are not available, the system detects tampering, a power loss occurs, a battery loss or battery fault occurs, a shutdown command by authorised service personnel is received, and/or the system 10 recognizes that it will shutdown shortly), the persistent data may be saved at the local control system non-volatile memory 26 rather than wait for the next scheduled periodic write.

When the local control system 20 is rebooted, as is done from time to time, the microprocessor 22 updates its local non-volatile memory 26 by synchronizing its last known distinguishing data element with the remote server 60. That is, during such rebooting process, the microprocessor 22 determines whether the remote data storage 70 has more recent persistent data than is included in the local non-volatile memory 26. If there is any more recent persistent data at the remote data storage 70, the remote server 60 communicates only that more recent persistent data via communications link 50 to the local control system 20 for storage of that more recent data on the local non-volatile memory 26, thereby bringing the local control system 20 up to date for continued operation as described above.

Additionally, it should be appreciated that extra data which is not normally held at the panel can use this system 10 to extend the availability of non-volatile storage 26 at the local control system 20.

It should thus be appreciated that security systems 10 configured and operating according to the present invention will reduce the frequency of persistent data writing to the non-volatile memory 26 (e.g., flash storage devices), which will increase the lifetime of that memory. Further, such operation, by storing the persistent data always at the remote data storage 70 can avoid write time delays such as occur with flash storage devices at the local control system 20, and similarly avoids chip erasing times (which can be problematic) and reduces the need for complex flash management (by reducing use of local flash memory 26). All of this can potential reduce the cost of local control panels 20 since they require less local memory.

It should also be appreciated that full storage of persistent data at the remote data storage 70 according to the present invention will increase the security of key data (e.g., destroying the local control system will not remove the comprehensive event log), as well as potentially reducing the amount of event storage required locally, while still maintaining persistent data accessible. Further, authorized service personnel get access to the event log data from the remote server 60, obviating the need to contact a local control system 20 directly. A remote location is likely to have a higher bandwidth connection (and/or can be provided without the need or expense of providing such high speed connections to local control systems 20), thereby reducing the time and cost of, for example, an installation company to get access to that data. Such data availability also will advantageously more easily allow statistical and other analysis of panel data and other information not previously accessible (e.g., installation personnel configuration methodology and efficiency [from data mining both events and recording timestamp information of system configuration changes], event log trends for certain types of events, and set/unset status trends).

It should still further be appreciated that security systems 10 according to the present invention may have access to considerably more memory (at the remote data storage 70) for future expansion, largely without limit. As already noted, such data can still be accessed by the local control system 20, providing access, for example, to large amounts of data such as video/picture data and event log size.

Moreover, the security system 10 of the present invention adds redundancy to system configuration, run-time data and event log data since normally the data is stored at two places: the local control system non-volatile memory 26 and the remote data storage 70 (in addition to any installer copy, which is likely out of date by months). Such extra copies are easily and inexpensively maintained, as they are made automatically during normal operation of the system 10.

Still further, it should be appreciated that the system 10 of the present invention enables extra data that is non-critical to system operation (and is normally not stored locally because of local storage constraints) to be safely saved remotely at the remote data storage 70. Such data useful for historical record and analytics can include, for example, a historical record of AC Mains power supply input state, voltage levels and any voltage spikes, ambient temperature, window/door state, wired or wireless local 'bus-device' communication quality, input ("Zone") resistance readings and variations and state change time-stamping, local noise levels, ambient light levels, picture storage for entry systems, and gas monitoring (e.g., natural gas, $CO_2$, $O_2$).

The invention claimed is:

1. A method of storing persistent data for a security system having a local control panel in communication with a remote server, said local control panel having local data storage and said remote server having storage remote from said local data storage, comprising the steps of:
   periodically transmitting in a first group of transmissions logical portions of current persistent data for saving at the remote server, and saving said logical portions of current persistent data at said local data storage, each of said logical portions of current persistent data being less than all of said current persistent data, and
   periodically transmitting in a second group of transmissions logical portions of current persistent data for saving only at the remote server with an associated distinguishing data element identifying a temporal order of the associated logical portion, and
   in the local data storage saving only said distinguishing data element of each associated logical portion of current persistent data saved only at the remote server, wherein said first group of transmissions is different from said second group of transmissions; and
   reconstructing the persistent data on the local control panel after rebooting the local control panel, wherein during said reconstructing step only said logical portions of current persistent data having distinguishing data elements subsequent to said distinguishing data element saved at said local data storage are read from said remote storage and saved at said local data storage.

2. The data storing method of claim 1, wherein said distinguishing data elements are time stamps.

3. The data storing method of claim 1, wherein said local data storage comprises non-volatile memory.

4. The data storing method of claim 3, wherein said local data storage comprises flash memory.

5. The data storing method of claim 1, wherein said remote data storage comprises at least one of RAM and EEPROM memory devices.

6. The data storing method of claim 5, wherein said local data storage comprises flash memory.

7. A security system, comprising:
   security devices generating persistent data;
   a local control system receiving said persistent data from said security devices, said local control system including a microprocessor and a non-volatile memory;
   a server remote from said local control system, said remote server having remote data storage and being in communication with said local control system microprocessor;
   wherein said local control system microprocessor:
      periodically transmits logical portions of current persistent data to the remote server for saving in said remote data storage, each of said logical portions of current persistent data being less than all of said current persistent data and said logical portions of current persistent data each being associated with a distinguishing data element, each distinguishing data element identifying a temporal order of the associated logical portion, and
      periodically saves said logical portions of current persistent data in said local control system non-volatile memory less frequently than said persistent data is periodically saved in said remote data storage, saves said distinguishing data element in the local data storage for each logical portion of current persistent data saved only at the remote server, and when rebooting said local control system retrieves from said remote data storage only said logical portions of current persistent data having distinguishing data elements subsequent to said distinguishing data element saved in the local data control system non-volatile memory.

8. The security system of claim 7, wherein said distinguishing data elements are time stamps.

9. The security system of claim 7, wherein said non-volatile memory comprises flash IC storage.

10. The security system of claim 9, wherein said remote data storage comprises at least one of RAM and EEPROM memory devices.

11. The security system of claim 7, wherein said remote data storage comprises at least one of RAM and EEPROM memory devices.

12. A security system, comprising:

security devices generating persistent data;

a local control system receiving said persistent data from said security devices, said local control system including a microprocessor and a non-volatile memory;

a server remote from said local control system, said remote server having remote data storage and being in communication with said local control system microprocessor;

wherein said local control system microprocessor receives current persistent data from said security devices, and periodically transmits in a first group of transmissions to the remote server logical portions of current persistent data received from said security devices for saving in said remote data storage, and saves said logical portions of current persistent data in said local control system non-volatile memory, each of said logical portions of current persistent data being less than all of said current persistent data, and periodically transmits in a second group of transmissions logical portions of current persistent data received from said security devices with an associated distinguishing data element identifying a temporal order of the associated logical portion for saving only in said remote data storage, and saves in said local control system non-volatile memory only said distinguishing data element associated with said current persistent data saved only in said remote data storage, wherein said first group of transmissions is different from said second group of transmissions; and when rebooting said local control system retrieves from said remote data storage only said logical portions of current persistent data having distinguishing data elements subsequent to said distinguishing data elements saved in the local data control system non-volatile memory.

* * * * *